(12) United States Patent
Peddanarappagari et al.

(10) Patent No.: US 7,155,124 B2
(45) Date of Patent: Dec. 26, 2006

(54) LOSS-LESS ARCHITECTURE AND METHOD FOR WAVELENGTH DIVISION MULTIPLEXING (WDM) OPTICAL NETWORKS

(75) Inventors: Kumar V. Peddanarappagari, Plano, TX (US); Paparao Palacharla, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 698 days.

(21) Appl. No.: 10/160,459

(22) Filed: May 31, 2002

(65) Prior Publication Data

US 2004/0208542 A1    Oct. 21, 2004

(51) Int. Cl.
*H04B 10/08* (2006.01)

(52) U.S. Cl. .............. 398/37; 398/38; 398/56; 398/82; 398/83

(58) Field of Classification Search .......... 398/37, 398/38, 56, 82, 83, 94, 45
See application file for complete search history.

(56) References Cited

U.S. PATENT DOCUMENTS

| | | | |
|---|---|---|---|
| 5,392,154 A | 2/1995 | Chang et al. | 359/341 |
| 5,452,116 A | 9/1995 | Kirkby et al. | 359/124 |
| 5,675,432 A | 10/1997 | Kosaka | 359/341 |
| 5,764,404 A | 6/1998 | Yamane et al. | 359/341 |
| 5,812,710 A | 9/1998 | Sugaya | 385/27 |
| 5,986,800 A | 11/1999 | Kosaka | 359/341 |
| 6,031,659 A | 2/2000 | Okiyama | 359/341 |
| 6,094,296 A | 7/2000 | Kosaka | 359/341 |
| 6,097,534 A | 8/2000 | Michishita et al. | 359/341 |
| 6,169,615 B1 | 1/2001 | Shirai | 359/124 |
| 6,236,482 B1 | 5/2001 | Toyohara | 359/134 |
| 6,256,141 B1 | 7/2001 | Kosaka | 359/341 |
| 6,259,555 B1 | 7/2001 | Meli et al. | 359/337 |
| 6,331,907 B1 | 12/2001 | Miyazaki et al. | 359/127 |
| 2002/0021861 A1 | 2/2002 | Gnauck et al. | 385/24 |
| 2002/0027704 A1 | 3/2002 | Kobayashi et al. | 359/341.1 |
| 2002/0109908 A1* | 8/2002 | Koteles et al. | 359/337.1 |
| 2002/0159688 A1* | 10/2002 | Kim et al. | 385/24 |
| 2002/0171889 A1* | 11/2002 | Takeuchi et al. | 359/124 |
| 2002/0176131 A1* | 11/2002 | Walters et al. | 359/118 |
| 2003/0002776 A1* | 1/2003 | Graves et al. | 385/24 |

* cited by examiner

*Primary Examiner*—David C. Payne
(74) *Attorney, Agent, or Firm*—Baker Botts L.L.P.

(57) ABSTRACT

A node for an optical network includes a demultiplexer operable to separate an ingress wavelength division multiplexed (WDM) signal into a plurality of ingress channels. An ingress amplifier array is coupled to the demultiplexer and includes a plurality of channel amplifiers. The channel amplifiers are each operable to independently amplify one of the ingress channels while maintaining a channel power variation between the channels within an operational limit of the network.

34 Claims, 2 Drawing Sheets

LOSS-LESS ARCHITECTURE AND METHOD FOR WAVELENGTH DIVISION MULTIPLEXING (WDM) OPTICAL NETWORKS

TECHNICAL FIELD

The present invention relates generally to optical networks and, more particularly, to a loss-less architecture for a wavelength division multiplexing (WDM) optical network.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss.

Optical networks often employ wavelength division multiplexing (WDM), including dense wavelength division multiplexing (DWDM), to increase transmission capacity. In WDM networks, a number of optical channels are carried in each fiber at disparate wavelengths. Network capacity is based on the number of wavelengths, or channels, in each fiber and the bandwidth, or size of the channels.

WDM networks use optical cross connects (OXC) or reconfigurable or other optical add/drop multiplexing (OADM) nodes to add, drop, and switch traffic in the network. OXCs and other network elements typically include ingress line amplifiers to compensate for line losses and egress line amplifiers to compensate for node losses. Within the node, variable attenuators (VATs) are used on demultiplexed signals to limit wavelength loss variation. VATs may be integrated with an optical cross connect (OXC) and an array wave-guide grating (AWG) of a node.

SUMMARY

The present invention provides a loss-less architecture for a wavelength division multiplexing (WDM) optical network and method. In a particular embodiment, wavelength by wavelength amplification is provided in network nodes. The amplifiers may be integrated with pump laser diodes, multiplexers, demultiplexers and/or optical switches on a single substrate of a node in order to reduce insertion losses, unit size and cost.

In accordance with one embodiment of the present invention, a node for an optical network includes a demultiplexer and an ingress amplifier array. The demultiplexer is operable to separate an ingress WDM signal into a plurality of ingress channels. The ingress amplifier array is coupled to the demultiplexer and includes a plurality of channel amplifiers. The channel amplifiers are each operable to independently amplify one of the ingress channels while maintaining a channel power variation between the channels within an operational limit of the network.

More particularly, in accordance with a specific embodiment of the present invention, a node may include a switch element coupled to the ingress amplifier array and operable to add, drop, and pass through channels to generate a set of egress channels. In this and other embodiments, an egress amplifier array may be coupled to the switch element. The egress amplifier array may include a plurality of channel amplifiers each operable to independently amplify one of the egress channels while maintaining the channel power variation within the operational limit of the network. A multiplexer may be coupled to the egress amplifier array and operable to combine the egress channels into an egress WDM signal.

In a specific embodiment, a system for loss-less optical network architecture includes a demultiplexer, a first erbium doped wave-guide amplifier (EDWA), an optical cross connect, a second EDWA, and a multiplexer. The demultiplexer receives a composite optical signal and separates the composite optical signal into a plurality of individual wavelengths. The individual wavelengths are independently amplified by the EDWA. The wavelengths are routed to their appropriate destination by the optical cross connect. Each wavelength is amplified by the second EDWA. The amplified wavelengths are then multiplexed into a composite signal by the multiplexer. The multiplexed signal may also be amplified.

Technical advantages of the present invention include providing a loss-less architecture for a WDM optical network and method. In one embodiment, amplification in an optical network is distributed between and within optical add/drop multiplexing (OADM) or other nodes of the network and is provided on a per channel basis. As a result, loss incurred in controlling wavelength loss variation is eliminated or otherwise reduced and network loss may be minimized. In addition, due to the reduced optical component insertion losses in the system, the system design is more flexible. Moreover, as soon as the power for a channel across a specific component drops, it is amplified.

Thus, the network may employ less expensive transmitters and receivers. Because all signals into the optical cross connect are at approximately the same power and all added channels are amplified before multiplexing, the transmitters and receivers need not include additional amplifiers. Therefore, the effective nodal noise figure and overall optical signal to noise ratio (OSNR) will improve, allowing longer span lengths and traversing more nodes without electrical regeneration.

Another technical advantage of the present invention includes providing an improved node for a WDM optical network. In a particular embodiment, the node provides wavelength by wavelength amplification with multiple amplifiers in the path inside the node. As a result, the gain and output power requirements of the amplifiers are reduced. In addition, the number of pump lasers required to support wavelength by wavelength amplification can be reduced by sharing the pump power between multiple single wavelength amplifiers on a single optical substrate.

Still another technical advantage of the present invention includes providing an integrated chip for OXC and other network elements. In a particular embodiment, pump laser diodes, multiplexers, demultiplexers, and optical switches for a network node are integrated onto a single substrate. An optical chip, for example, may have WDM input and output ports with additional fiber ribbons for adding/dropping channels, thus reducing the number of input and output fibers into the module. Such integration reduces insertion losses as well as unit size and the overall cost of the system.

It will be understood that the various embodiments of the present invention may include some, all or none of the enumerated technical advantages. In addition, other technical advantages of the present invention will be readily apparent to one skilled in the art from the following figures, description and claims.

BRIEF DESCRIPTION

For a more complete understanding of the present invention and its advantages, reference is now made to the following description taken in conjunction with the accompanying drawings, wherein like numerals represent like parts, in which.

DETAILED DESCRIPTION

Figure 1:
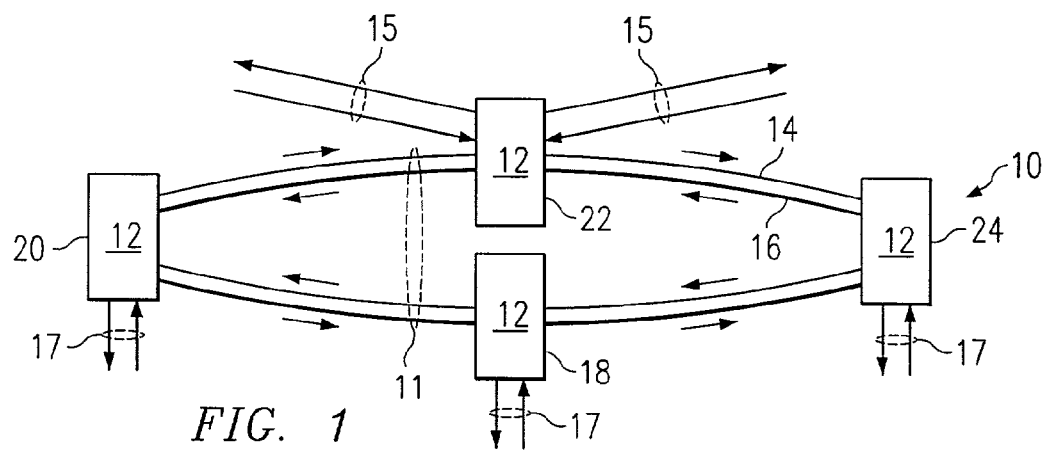
FIG. 1 is a block diagram illustrating an optical communication system in accordance with one embodiment of the present invention.

FIG. 1 illustrates an optical network 10 in accordance with one embodiment of the present invention. In this embodiment, the network 10 is a wavelength division multiplexing (WDM) network, which may be a dense wavelength division multiplexing (DWDM) network or other suitable multi-channel network in which a number of optical channels are carried over a common path at disparate wavelengths. The network 10 may be a short-haul metropolitan network, a long-haul inter-city network, or any other suitable network or combination of networks.

Referring to FIG. 1, the network 10 includes a plurality of nodes 12 coupled to an optical ring 11, which may include a first fiber 14, and a second fiber 16. Optical information signals are transmitted in different directions on the fibers 14 and 16 to provide fault tolerance. The optical signals have at least one characteristic modulated to encode audio, video, textual, real-time, non-real-time and/or other suitable data. Modulation may be based on phase shift keying (PSK), intensity modulation (IM), and/or other suitable methodologies.

In the ring 11, each node 12 both transmits traffic to and receives traffic from each neighboring node. As used herein, the term "each" means every one of at least a subset of the identified items. The network 10 may have other suitable ring and non-ring configurations. Additionally, one or more of nodes 12 may be coupled to other networks or client systems. For example, one or more of nodes 12 may be coupled to a long-haul network, as illustrated by node 22 coupled to a long-haul network (not shown) by link 15. One or more of nodes 12 may also be coupled to other networks or client systems, as shown, for example, by node 20 coupled to another network (not shown) by links 17.

In the illustrated embodiment, the first fiber 14 is a clockwise fiber in which traffic is transmitted in a clockwise direction. The second fiber 16 is a counterclockwise fiber in which traffic is transmitted in a counterclockwise direction. The traffic may include both work and protection channels.

The nodes 12 are operable to add, drop, and/or pass through traffic to and from the ring 11. At each node 12, traffic received from local clients from, for example link 17, is added to the fibers 14 and 16 while traffic destined for local clients is dropped to a broadband receiver. Traffic may be added to the rings 14 and 16 by inserting the traffic channels or otherwise combining signals of the channels into a transport signal of which at least a portion is transmitted on one or both fibers 14 and 16. Traffic may be dropped from the fibers 14 and 16 by making the traffic available for transmission to the local clients. In one embodiment, the nodes 12 are operable to multiplex data from clients for adding to the fibers 14 and 16 and to demultiplex channels of data from the fibers 14 and 16 for clients. In this embodiment, the nodes 12 may also perform optical to electrical conversion of the signals received from and sent to the clients.

Total channel wavelengths of the network 10 may be divided and assigned to each node 12 depending on the local or other traffic of the nodes 12. For an embodiment in which the total channel wavelengths is forty and total number of nodes 12 is four and the node traffic is even in each node 12, then ten channel wavelengths may be assigned to each node 12. If each channel wavelengths is modulated by 10 Gb/s data-rate, each node can send 100 Gb/s (10 Gb/s×10 channel wavelengths) to all nodes in the network 10. For a DWDM system, the channel wavelengths may be between 1530 nm and 1565 nm. The channel spacing may be 100 GHz or 0.8 nm, but may be suitably varied.

Optical signals in the network 10 experience power losses associated with transmission media and node processing. As described in more detail in connection with FIG. 2, the nodes 12 include line and channel amplifiers to compensate for line and node losses. Generally, line amplifiers amplify WDM or other composite signals and channel amplifiers amplify the constituent components, or groups of constituent components, of a WDM or other composite signal. The network 10 may have a loss-less architecture that controls power variations between channels of a WDM signal without driving the power levels down or otherwise inducing additional loss. This may provide minimal cumulative power loss over a series of optical components.

Figure 2:
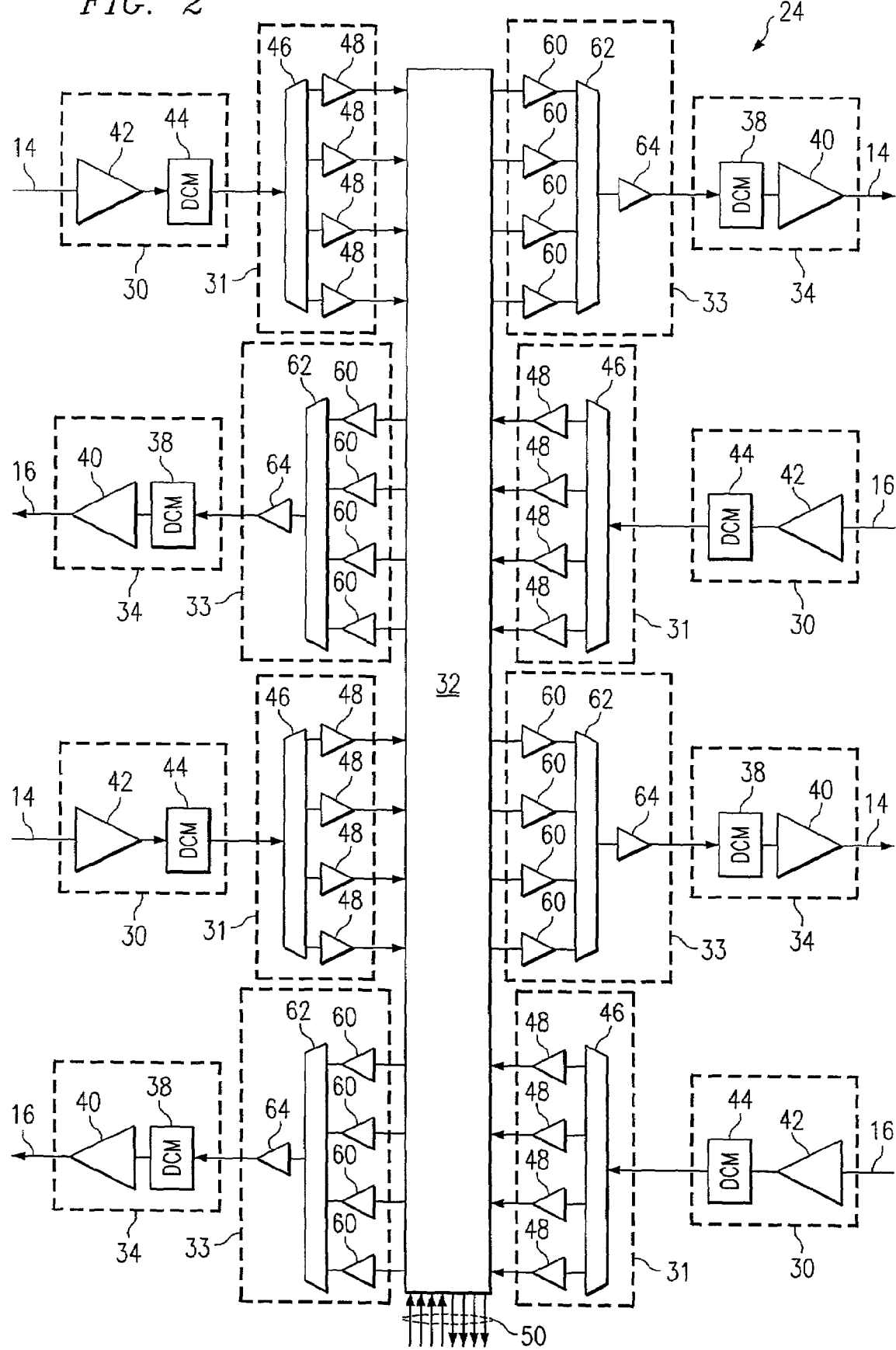
FIG. 2 is a block diagram illustrating a switching node of the optical communication system of FIG. 1 in accordance with one embodiment of the present invention.

FIG. 2 illustrates details of the node 12 in accordance with one embodiment of the present invention, shown by illustrative node 24 of FIG. 1. Node 24 includes a switch element operable to add, drop, or pass through, on a channel by channel basis, each channel wavelength. The switch element in one embodiment may be an optical cross connect (OXC), an optical add/drop multiplexer (OADM), or a reconfigurable OADM (ROADM). Node 24 may be any other suitable network element operable to separate a combined signal into its constituent channels and to switch or otherwise process the channels.

Referring to FIG. 2, the node 24 may be connected to a plurality of bidirectional rings or other networks. The node 24 includes a plurality of ingress modules 30, a demultiplexer unit 31, an optical cross connect 32, a multiplexer unit 33, and a plurality of egress modules 34.

The ingress modules 30 are coupled to demultiplexer unit 31 and ingress links, shown by illustrative fiber 14. Ingress modules 30 are operable to receive and amplify a WDM signal and transmit the signal to demultiplexer unit 31. In one embodiment, ingress module 30 comprises a WDM low-gain amplifier 42 and a dispersion compensation module (DCM) 44. In operation, a WDM signal is received by ingress module 30 via, for example, fiber 14. The WDM signal is amplified by WDM low gain amplifier 42 and transmitted to DCM 44. DCM 44 receives the amplified optical signal from amplifier 42 and aligns the spectral components of each channel (wavelength) of the WDM signal. When each channel's spectral components are in phase, DCM 44 transmits the phase-aligned optical signal to demultiplexer unit 31.

Demultiplexer unit 31 is operable to receive a WDM signal, demultiplex the signal to generate ingress channel signals, amplify each ingress channel signal, and transmit the amplified signals to optical cross connect 32. In one embodiment, demultiplexer unit 31 comprises a demultiplexer 46 and an ingress amplifier array including a plurality of ingress channel amplifiers 48. Demultiplexer 46 demultiplexes the optical signals from the single WDM signal and generates individual ingress channel signals from the composite WDM signal. The ingress channel signals may include sets or groups of related or other signals. The demultiplexer separates the constituent channels carrying payload traffic, in one embodiment, all of the constituent channels. Optical supervisory, control, and other channels may be separated with other channels or otherwise preserved. Demultiplexer 46 then transmits each individual channel wavelength to an associated, or corresponding, channel amplifier 48. The array includes a distinct channel amplifier for every, substantially every, a majority, or other suitable portion of the constituent channels.

Channel amplifiers 48 are operable to receive a channel signal, amplify the channel signal, and transmit the channel signal to OXC 32. Channel amplifiers 48 are each operable to independently amplify one of the ingress channels while maintaining a channel power variation between the channels within an operational limit of the network, which may be based on equipment limitations in the node or elsewhere in the network. A channel amplifier independently amplifies a channel when it amplifies the channel, without regard to or without effecting the amplification of other channels. The network operational limit is the maximum power variation between channels at the output of the amplifiers at which the network is designed to operate, or at which the network can tolerate without significant or unacceptable error rates. In one embodiment, the network operational limit is less than 3 dB variation between channel powers. In another embodiment, network operational limits are less than 1 dB variation between channel powers. A channel amplifier is an amplifier operable to independently amplify a separated portion of WDM signal.

In one embodiment, WDM low gain amplifiers 42 are erbium doped fiber amplifiers (EDFAs), but may comprise a semiconductor optical amplifier (SOA), or other suitable optical amplifiers. In one embodiment, DCM 44 is a dispersion compensating fiber (DCF), but may comprise a fiber Bragg grating, a liquid crystal, or other suitable media. In one embodiment, channel amplifiers 48 are erbium doped wave-guide amplifiers (EDWAs), but may comprise other suitable low gain, per channel amplifiers. In one embodiment, demultiplexer 46 comprises an arrayed wave-guide grating (AWG), but other suitable demultiplexers may also be employed.

Furthermore, WDM low gain amplifier 42 and DCM 44 may be situated on a dedicated optical chip or otherwise integrated into a single substitute or may be situated on the same optical chip as demultiplexer 46 and channel amplifier 48. In some embodiments, WDM low gain amplifier 42, DCM 44, demultiplexer 46, channel amplifiers 48, OXC 32, egress module 34, WDM low gain amplifier 36, DCM 38, and high gain amplifier 40 may all be situated on the same optical chip or substrate.

Optical cross connect (OXC) 32 is operable to receive a plurality of channel optical signals and direct the channel optical signals to their appropriate destination. For example, an optical cross connect may switch signals by dropping a particular optical signal, adding a new channel signal, dropping a particular signal and adding a new channel signal, or passing-through a particular channel signal intact. The optical cross connect is in one embodiment operable to drop any channel to any broadband or other receiver. Independent amplification of each channel allows OXC 32 to drop channels to different receivers, despite the more difficult power control caused by the increased potential for larger loss variation and higher power loss.

Optical cross connect (OXC) 32 is coupled to tunable transmitters and broadband receivers via links 50. Optical cross connect 32 receives and sends optical channel signals via links 50 to the tunable transmitters and broadband receivers. OXC 32 is further operable to transmit outbound channel signals to multiplexer unit 33. In one embodiment, optical cross connect 32 may include micro-electrical-mechanical (MEM) switches.

Multiplexer unit 33 is operable to receive a plurality of egress channel signals from OXC 32, amplify each channel signal and multiplex the channel signals into a composite WDM signal, and transmit the composite signal to egress module 34. Multiplexer unit 33 includes an egress amplifier array including a plurality of egress channel amplifiers 60, a multiplexer 62, and a WDM low-gain amplifier 64. Each channel signal is amplified by an associated or corresponding egress channel amplifier 60 to generate an amplified channel signal. The array includes a distinct channel amplifier for every, substantially every, a majority, or other suitable portion of the constituent channels. The amplified channel signals are transmitted to the multiplexer 62 where they are combined by multiplexer 62 into a single composite WDM optical signal. WDM low gain amplifier 36 amplifies the composite WDM signal and transmits the signal to egress module 34. Because dispersion compensation modules operate at a much lower power level than standard optical amplifiers (−3 dB or less), the composite WDM signal is amplified with a low-gain amplifier prior to the dispersion compensating module (DCM).

Egress module 34 includes DCM 38 and high-gain amplifier 40. DCM 38 receives the WDM optical signal, aligns the spectral components of each channel, and transmits the phase-aligned optical signal to high gain amplifier 40. High gain amplifier 40 receives the WDM signal from DCM 38, amplifies the WDM signal, and transmits it to the optical network, for example, along fiber 14.

Although the present invention has been described in one embodiment with a particular grouping of components in the ingress, demultiplexer, OXC, multiplexer, and egress modules, it will be understood that other component groupings may also be employed, based on the network requirements. For example, in one embodiment, demultiplexer unit 31 includes demultiplexer 46, but not ingress channel amplifiers 48, which are instead integrated with OXC 32. Similarly, egress channel amplifiers 60 may also be integrated with OXC 32, instead of multiplexer unit 33. In yet another embodiment, demultiplexer 31, OXC 32, and multiplexer unit 33 are all situated on a single substrate. It will be understood by one skilled in the art that other combinations are also possible.

Controlling power losses across the node by distributing amplification reduces the optical noise to signal ratio (ONSR). Distributing amplification entails amplifying each signal at each component, instead of allowing the power losses to accumulate across the node and amplifying the attenuated signals. Because a WDM amplifier pump power is typically limited, all channels in WDM share the power in the WDM amplifiers. The channel amplifiers prevent one channel in WDM from monopolizing the power of the amplifier by maintaining the channels at approximately the same power.

The number of pump lasers required to support loss-less architecture can be reduced by sharing the pump power between multiple single wavelength amplifiers on a single optical substrate. Thus, EDWAs may share a pump, as size issues may preclude a pump for each channel amplifier. The total pump power to support single wavelength amplifiers for all the wavelengths in a 40 channel system may be, for example, between 17 to 23 dBm. An EDFA may have its own pump separate from the EDWA pump, but other configurations are also possible.

Amplification at the channel amplifier while maintaining power variation control may be performed by driving the amplifiers to saturation, by providing a feed back loop, or otherwise. Channels are maintained within a power variation range when amplified to a power level within the range. Single wavelength amplifiers can be driven into saturation to reduce the power level variations between wavelengths and to reduce the gain tilt introduced by AWGs, other amplifiers, connector loss variations, and other component losses. Lower-gain WDM amplifiers may be used in the node so that power variation can be reduced.

Figure 3:
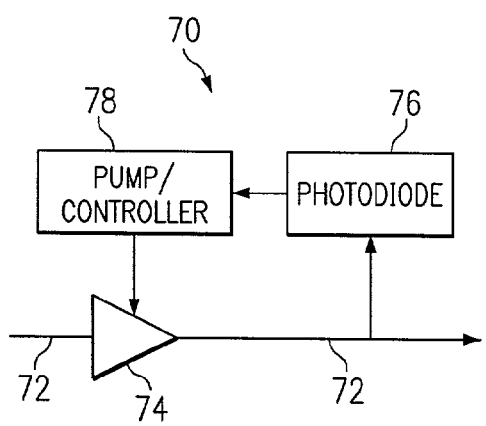
FIG. 3 is a block diagram illustrating a controller for a channel amplifier of FIG. 2 in accordance with one embodiment of the present invention.

FIG. 3 illustrates an exemplary feedback loop in accordance with one embodiment of the present invention. Each channel amplifier may have a discrete controller, or a set of amplifiers may in some applications share a controller. Amplifier 70 includes a plurality of optical links 72, an amplifier module 74, a photodiode 76, and a pump/controller 78. Amplifier module 74 receives an optical signal for amplification along link 72. Amplifier module 74 is operable to receive pump light energy and/or control signals from pump/controller 78. Amplifier module 74 receives the signal to be amplified and, based on the signals received from pump/controller 78, generates an amplified signal for transmission along link 72.

Photodiode 76 is operable to tap a portion of the amplified signal traveling along link 72 on the output side of amplifier module 74 and to transmit an electrical signal based on the amplified output signal to pump/controller 78. Pump/controller 78 receives the electrical signal and generates pump light energy and/or a control signal based on the received electrical signal. Pump/controller 78 transmits this resulting signal to amplifier module 74.

Typical power levels range from −5 to +5 dBm per wavelength, depending on the pump power of an amplifier. For example, one pump at 23 dBm may operate to amplify 40 channels by 19 dB, or 80 channels by 16 dB. For this gain, per channel power is approximately equal to +4 dBm. The final amplifier in a series (e.g., high gain amplifier 40) may adjust power at different levels depending on the system application.

Figure 4:
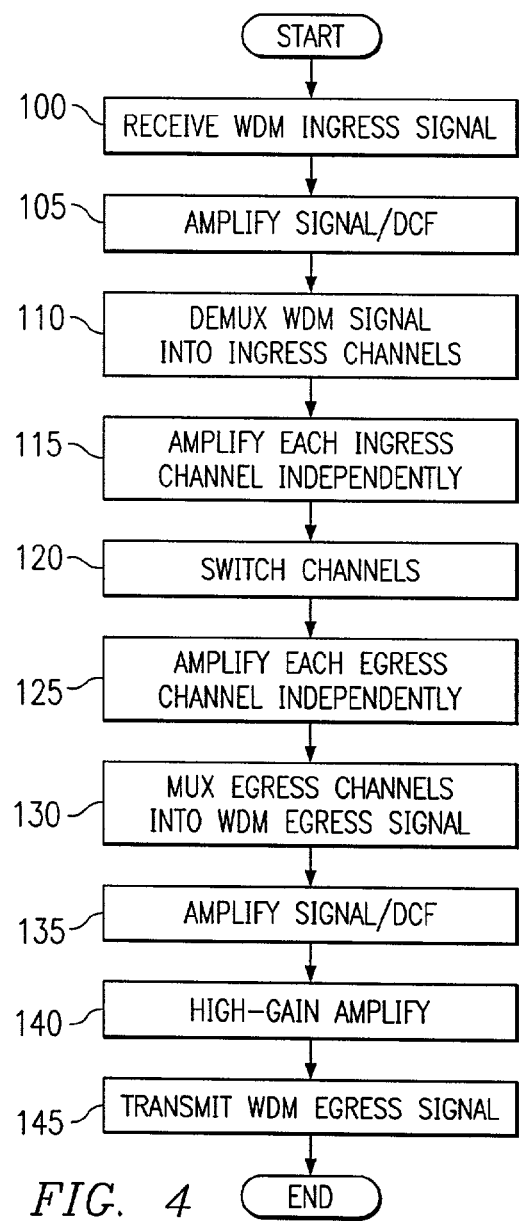
FIG. 4 is a flow diagram illustrating a method for processing signals in a node of an optical network in accordance with one embodiment of the present invention.

FIG. 4 illustrates a method for loss-less optical network architecture in accordance with one embodiment of the present invention. The process begins at step 100 wherein a WDM signal is received at a port of the ingress module 30. Next, at step 105, the received WDM signal is amplified. This amplification compensates for line or span loss. In one embodiment, a dispersion compensation module (DCM) is also used to align the spectral components of each channel of the composite WDM signal. In one embodiment, this step is performed by WDM low gain amplifier 42 and DCM 44 of ingress module 30.

Next at step 110, the composite WDM signal is de-multiplexed to separate out the individual channels or wavelengths. In one embodiment, this step is performed by demultiplexer 46 of ingress module 30. Next, at step 115, each channel is amplified individually. In one embodiment, this step is performed by channel amplifiers 48 of demultiplexer unit 31.

Next, at step 120, each channel signal is routed or otherwise switched. Channel signals may be added, dropped, or passed through an optical switch. In one embodiment, this step is performed by optical cross connect (OXC) 32. Next at step 125, each outgoing channel is amplified independently. In one embodiment, this step may be performed by channel amplifiers 60 of multiplexer unit 33. In an alternative embodiment, channels may not be amplified independently but may be bundled together into a plurality of bands, which are then amplified.

Next at step 130, the individual channel signals are multiplexed into a composite WDM signal. In one embodiment this step is performed by multiplexer 62 of multiplexer unit 33. Next at step 135, the composite WDM signal is amplified. In one embodiment, this step is performed by WDM low gain amplifier 64 of multiplexer unit 33. In one embodiment, the composite signal may also be routed through a dispersion compensation module (DCM) to align per channel spectral components in the composite WDM signal. In one embodiment, this step is performed by DCM 38 of egress module 34.

Next, at step 140, the composite WDM signal is amplified further. In one embodiment, this step is performed by high gain amplifier 40 of egress module 34. Next, at step 150, the high gain amplified signal is transmitted to the fiber optic network.

Although the method of FIG. 4 has been shown with specific steps in a specific order, it will be understood that the steps may be performed in a different order as appropriate, and other steps may be added or omitted as appropriate in keeping with the spirit of the present invention. The process of FIG. 4 may be repeated continuously or periodically, in parallel or otherwise. In addition, one or more of the steps may be omitted during one or more cycles of the method. For example, if the power losses in a particular channel signal from ingress module 30 through optical cross connect 32 and into egress module 34 are minimal, channel amplification by channel amplifier 60 may be unnecessary. Losses introduced by the dispersion compensation module (DCM) can also be compensated for by a built-in WDM amplifier.

Although the present invention has been described with several embodiments, various changes and modifications may be suggested to one skilled in the art. It is intended that the present invention encompass such changes and modifications as fall within the scope of the appended claims.

What is claimed is:

1. A node for an optical network, comprising:
   a demultiplexer operable to separate an ingress wavelength division multiplexed (WDM) signal into a plurality of ingress channels;
   an ingress amplifier array coupled to the demultiplexer, the ingress amplifier array including a plurality of channel amplifiers, the channel amplifiers each operable to independently amplify one of the ingress channels while maintaining a channel power variation between the channels within an operational limit of the network;
   a switch element coupled to the ingress amplifier array, the switch element operable to add and drop channels to generate a set of egress channels;
   an egress amplifier array coupled to the switch element, the egress amplifier array comprising a plurality of channel amplifiers, the channel amplifiers each operable to independently amplify one of the egress channels while maintaining a channel power variation within the operational limit of the network; and a multiplexer coupled to the ingress amplifier array and operable to combine the egress channels into an egress WDM signal.

2. The node of claim 1, further comprising a discrete channel amplifier for every ingress signal of the ingress WDM signal.

3. The node of claim 1, further comprising an ingress line amplifier operable to amplify the ingress WDM signal.

4. The node of claim 1, further comprising an egress line amplifier operable to amplify the egress WDM signal.

5. The node of claim 1, the switch element comprising an optical cross connect.

6. The node of claim 1, wherein the demultiplexer is integrated with the ingress amplifier array into a single substrate.

7. The node of claim 1, wherein the multiplexer is integrated with the egress amplifier array into a single substrate.

8. The node of claim 1, wherein the switch element is integrated with the ingress amplifier array and the egress amplifier array into a single substrate.

9. The node of claim 1, wherein the channel amplifiers each comprise an erbium doped wave-guide amplifier (EDWA).

10. The node of claim 1, wherein the each channel amplifier is operated at saturation.

11. The node of claim 1, further comprising a controller for each channel amplifier, the controller operable to independently control gain of a corresponding ingress channel across the amplifier.

12. The node of claim 1, wherein the channel power variation between the channels is maintained at less than 3 dB.

13. The node of claim 1, wherein the channel power variation between the channels is maintained at less than 1 dB.

14. A method for processing a signal at a node of an optical network, comprising:

receiving an ingress wavelength division multiplexer (WDM) signal;

demultiplexing the ingress WDM signal into its constituent channels;

independently amplifying each of the constituent channels while maintaining a channel power loss variation between the channels within an operational limit of the network;

switching the channels;

independently amplifying each of a plurality of egress channels of the node while maintaining a channel power variation between the egress channels within the operational limit of the network; and multiplexing the egress channels into an egress WDM signal for transmission in the optical network.

15. The method of claim 14, further comprising independently amplifying the constituent channels while maintaining the channel power variation by independently amplifying each constituent channel with a discrete channel amplifier at saturation.

16. The method of claim 14, further comprising independently amplifying each constituent channel while maintaining the channel power variation by independently amplifying each constituent channel with a discrete channel amplifier and controlling the gain of each channel across its corresponding channel amplifier.

17. The method of claim 14, further comprising amplifying the ingress WDM signal.

18. The method of claim 14, further comprising amplifying the egress WDM signal.

19. The method of claim 14, further comprising independently amplifying each of the constituent channels using a discrete channel amplifier.

20. The method of claim 19, wherein the discrete channel amplifier comprises an erbium doped wave-guide amplifier (EDWA).

21. The method of claim 14, further comprising switching the channels using an optical cross connect.

22. The method of claim 14, wherein the channel power variation between the channels is maintained at less than 3 dB.

23. The method of claim 14, wherein the channel power variation between the channels is maintained at less than 1 dB.

24. A system for processing a signal at a node of an optical network, comprising:

means for receiving an ingress wavelength division multiplexer (WDM) signal;

means for demultiplexing the ingress WDM signal into its constituent channels;

means for independently amplifying each of the constituent channels while maintaining a channel power loss variation between the channels within an operational limit of the network;

means for switching the channels;

means for independently amplifying each of a plurality of egress channels of the node while maintaining a channel power variation between the egress channels within the operational limit of the network; and means for multiplexing the egress channels into an egress WDM signal for transmission in the optical network.

25. The system of claim 24, the means for independently amplifying the constituent channels while maintaining the channel power variation operable to independently amplifying each constituent channel with a discrete channel amplifier at saturation.

26. The system of claim 24, the means for independently amplifying each constituent channel while maintaining the channel power variation operable to independently amplify each constituent channel with a discrete channel amplifier and control the gain of each channel across its corresponding channel amplifier.

27. The system of claim 24, further comprising means for amplifying the ingress WDM signal.

28. The system of claim 24, further comprising means for amplifying the egress WDM signal.

29. The system of claim 24, the means for independently amplifying each of the constituent channels comprising discrete channel amplifiers.

30. The system of claim 29, wherein the discrete channel amplifier comprises an erbium doped wave-guide amplifier (EDWA).

31. The system of claim 24, the means for switching the channels comprising an optical cross connect.

32. The system of claim 24, wherein the means for independently amplifying each of the constituent channels is operable to maintain the channel power loss variation at less than 3 dB.

33. The system of claim 24, wherein the means for independently amplifying each of the constituent channels is operable to maintain the channel power loss variation at less than 1 dB.

34. A system for loss-less optical network architecture, comprising:
- a demultiplexer, operable to receive an ingress optical signal and generate a plurality of ingress optical channel signals based on the ingress optical signal;
- a plurality of first optical amplifiers coupled to the demultiplexer, each amplifier associated with a single ingress optical channel signal and operable to increase the gain of its associated ingress optical channel signal to generate a plurality of first amplified signals based on the associated optical channel signals;
- a switch, coupled to the plurality of first optical amplifiers and a plurality of tunable transmitters and broadband receivers, operable to receive the plurality of first amplified signals and route each signal to the plurality of tunable transmitters and broadband receivers or to one of a plurality of second optical amplifiers coupled to the switch, the switch further operable to receive an optical signal from the plurality of tunable transmitters and broadband receivers and route the optical signal to one of the plurality of second optical amplifiers;
- the plurality of second optical amplifiers operable to increase the gain of an associated first amplified signal to generate a plurality of egress optical channel signals based on the first amplified signals;
- a multiplexer coupled to the plurality of second optical amplifiers, and operable to receive a plurality of egress optical channel signals and generate a combined egress signal based on the plurality of egress optical channel signals; and
- a low-gain amplifier coupled to the multiplexer and operable to receive a combined egress signal and generate an amplified egress signal based on the combined egress signal.

* * * * *